(12) United States Patent
Onder

(10) Patent No.: US 6,995,231 B2
(45) Date of Patent: Feb. 7, 2006

(54) EXTRUDABLE HIGHLY CRYSTALLINE THERMOPLASTIC POLYURETHANES

(75) Inventor: Kemal Onder, Brecksville, OH (US)

(73) Assignee: Noveon IP Holdings, Corp., Cleveland, OH (US)

( * ) Notice: Subject to any disclaimer, the term of this patent is extended or adjusted under 35 U.S.C. 154(b) by 487 days.

(21) Appl. No.: 10/036,567

(22) Filed: Dec. 21, 2001

(65) Prior Publication Data

US 2003/0139509 A1 Jul. 24, 2003

(51) Int. Cl.
*C08G 18/08* (2006.01)
*C08G 18/10* (2006.01)
*C08G 18/71* (2006.01)
*C08G 18/32* (2006.01)

(52) U.S. Cl. ............... 528/55; 528/58; 528/69; 528/75; 528/79; 528/85; 428/423.1

(58) Field of Classification Search ............ 528/79, 528/85, 55, 58, 69, 75; 428/423.1
See application file for complete search history.

(56) References Cited

U.S. PATENT DOCUMENTS

| 4,371,684 A | 2/1983 | Quiring et al. ............ 528/65 |
| 4,376,834 A | 3/1983 | Goldwasser et al. ........ 521/159 |
| 6,022,939 A | 2/2000 | Pudleiner et al. | |

FOREIGN PATENT DOCUMENTS

| EP | 0347794 | 12/1989 |
| JP | 06166738 | 6/1994 |
| WO | WO9415985 | 7/1994 |
| WO | WO0250151 | 6/2002 |

*Primary Examiner*—Kriellon A. Sanders
(74) *Attorney, Agent, or Firm*—Joe A. Powell; Thoburn T. Dunlap; Daniel J. Hudak

(57) ABSTRACT

A thermoplastic polyurethane composition having a high crystalline content which advantageously can be processed in an extruder. The composition includes a crystallization retarding component of a short chain or monomeric diol which is branched, substituted or contains heteroatoms, or a combination thereof. The crystallization retarding component delays the onset of crystallization during extrusion processing until the composition has exited the extruder.

36 Claims, 16 Drawing Sheets

Ester TPU, hard segment content 58.9% with no CRC

Ester TPU, hard segment content 59.7% with 10 Equivalents of CRC

Ether TPU, hard segment content 52.4% with no CRC

Ether TPU, hard segment content 54.2% with 8.8 Equivalents of CRC

Ester TPU, hard segment content 48.4.9% with no CRC

Ester TPU, hard segment content 54.6% with 10 Equivalents of CRC

Ether TPU, hard segment content 31.2% with no CRC

Ether TPU, hard segment content 31.6% with 10 Equivalents of CRC

CRYSTALLIZATION RETARDING
COMPONENT=10 EQUIVALENTS;
HS=59.7%; @210°C

CRYSTALLIZATION RETARDING
COMPONENT=10 EQUIVALENTS; HS=54.6%;
@210°C

EXTRUDABLE HIGHLY CRYSTALLINE THERMOPLASTIC POLYURETHANES

FIELD OF THE INVENTION

The present invention relates to thermoplastic polyurethane (TPU) compositions including a crystallization retarding component which advantageously improves processing behavior and allows highly crystalline compositions to be processed in an extruder. The crystallization retarding component is generally present in the polyurethane composition in amounts sufficient to reduce crystal formation during the extrusion process and essentially delay crystallization onset until the composition has exited an extruder die or outlet, without altering the desirable properties of the final product. The crystallization retarding components comprise short chain or monomeric diols which are branched, substituted, or contain heteroatoms.

BACKGROUND OF THE INVENTION

Typically, highly crystalline, phase separated thermoplastic polyurethanes have not been utilized in extrusion applications as the compositions are generally difficult to process or even unprocessable as they crystallize and form conglomerates or chunks of solid matter in the extrusion process equipment. Furthermore, attempts to prevent crystallization by increasing the processing temperatures of the extrusion equipment have been unsuccessful and result in heat-decomposed products.

Highly crystalline thermoplastic polyurethane (TPU) products with desirable properties for extrusion have heretofore generally been unavailable. Thermoplastic polyurethanes with high crystallinity have stronger wear resistance and solvent resistance than their relatively low crystalline counterparts.

Highly crystalline thermoplastic polyurethanes also set up faster during extrusion process making the extruded shapes such as hose, tube, sheets, films, fibers and profiles easier to handle after the polymer melt exits the shaping die. This is desirable because it leads to increased productivity and better final product quality.

SUMMARY OF THE INVENTION

The present invention relates to extruded thermoplastic polyurethane compositions having high crystallinity. Advantageously, the thermoplastic polyurethane includes a crystallization delaying or retarding component that allows the compositions to be easily extruded without causing appreciable solid or crystallization buildup in an extruder. Advantageously, the crystallization retarding component shifts or lowers the crystallization temperature of a composition when compared to the same composition without the crystallization retarding component.

Generally, highly crystalline thermoplastic polyurethanes contain a relatively high amount of hard segments. Crystallinity is desired because it enhances the mechanical properties, chemical resistance and heat resistance of the final product. The low levels of crystallization retarding component still allow crystallization of hard blocks to proceed but at a much slower rate than without the same. Thus desirable polymer properties are still retained. The slower crystallization rate in turn does not permit the formation of crystalline solid matter or chunks to build up in the extruder. High quality extruded crystalline products such as films, sheets, or tubing, etc., can be obtained.

DETAILED DESCRIPTION OF THE INVENTION

Figure 1:
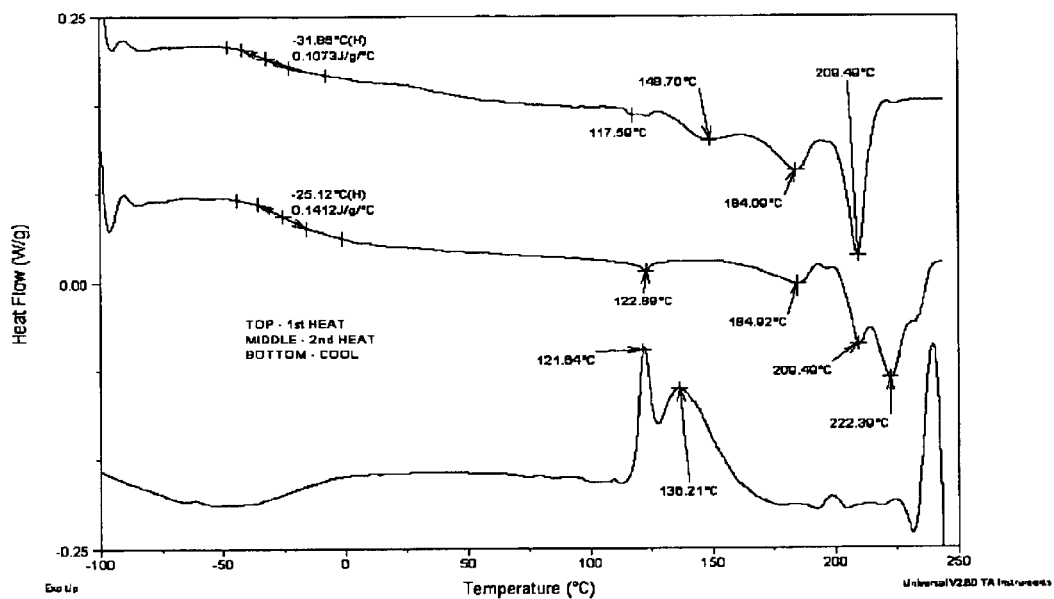
FIGS. 1 through 8 illustrate graphs produced by a differential scanning calorimeter (DSC) for various polyurethane formulations as set forth in the Example section.

The thermoplastic polyurethanes of the present invention have a high crystalline content and include a crystallization retarding component, such as dipropylene glycol, which allows the compositions to be extruded and processed into useful products.

The crystallization temperature of the composition can typically be determined by differential scanning calorimetery. Generally, crystallized compositions can be melted, solvated, or otherwise amorphized and then recrystallized. The term crystallizable refers to compositions that are a) crystallized or b) uncrystallized, but capable of crystallization by a reduction in temperature of the composition.

Highly crystalline or high crystalline content refers to thermoplastic polyurethane compositions which contain at least about 20%, 25%, 30% or 40% of hard segment content up to about 70%, 80%, 90%, 95%, or even 100%. Hard segment content can be defined as equal to the total of the weight percent of the isocyanate component, chain extenders, and crystallization retarding component divided by the total weight percent of the thermoplastic polyurethane composition (weight percent of isocyanate component, chain extender, crystallization retarding component, and polyol component). It is known that not all highly crystalline polymers fall within the above-defined range of hard segments, but the same are to be included within the scope of the invention. Highly crystalline thermoplastic urethanes are those which readily crystallize during the extrusion process in an extrude. Their crystallinity can also be quantified by those of ordinary skill in the art by typical DSC scans, for example as shown in FIG. 1 through FIG. 8 hereinbelow. Compositions that show greater than generally about 4, desirably about 4.5, and preferably about 5 or 5.5 up to about 20, 25, 30 or 40 J/g heat of crystallization exotherm, as calculated by ASTM test D3417-99, (third curve of each DSC graph) during cool down from melt can be described as highly crystalline.

Thermoplastic polyurethane composition refers to a composition containing polyurethane, reagents used to form the polyurethane, or a combination thereof and can refer to the composition prior to extrusion, within the extruder, or after extrusion.

The thermoplastic polyurethanes of the present invention are generally prepared by combining and reacting a) a polyol component of at least one hydroxyl terminated intermediate such as hydroxyl terminated polyester, polyether, polycarbonate, or polycaprolactone with b) at least one polyisocyanate component, c) a crystallization retarding component, d) at least one primary chain extender and optionally, a catalyst. These reactants generate a thermoplastic polyurethane in, for example, an extruder or other reaction vessel.

The components of the high crystalline content polyurethane composition can be combined to form the polyurethane composition prior to introduction into the extruder or they can be combined in situ within the extruder. The crystallization retarding component is typically provided in an amount sufficient to produce less build-up of crystallized polyurethane or solid matter in the extruder than would be found using the same polyurethane composition without the crystallization retarding component. For purposes of this comparison, the amount of build-up for a given amount of material that has been extruded can be determined in a variety of ways including, for example, comparing the thickness of the build-up, the surface area of the extruder covered by the build-up, and/or the weight of the build-up for a given amount of polyurethane composition extruded at the same conditions. For example, for a given extruder, extruder configuration, extrusion conditions (e.g., extrusion temperature(s), pressure(s), and speed(s), and period of time, the addition of a crystallization retarding component can reduce the build-up by at least 90%. Extrusion conditions and amounts of crystallization retarding component can be chosen so that build-up can be reduced generally by at least 95%, and even by at least 98%, 99%, or more. In at least some instances, the addition of a crystallization retarding component can prevent, i.e. reduce by about 100%, what would otherwise be significant, buildup for a given set of conditions and period of time. The specified percentage of reduction in build-up is achieved if there is the appropriate reduction in buildup according to at least one measurement criterion, even if that reduction percentage is not met when using another measurement criteria.

Polyols

The thermoplastic polyurethanes of the present invention include a polyol component, which include but are not limited to hydroxyl terminated polyesters, hydroxyl terminated polyethers, hydroxyl terminated polycarbonates, hydroxyl terminated polycaprolactones and hydroxyl terminated polyolefins.

The class of hydroxyl terminated polyesters are generally polyesters, often linear polyesters, having a number average molecular weight, $M_n$, of at least 500 and typically no more than 10,000 to provide the polyurethane with a distribution of hard and soft segments. The number average molecular weight of the hydroxyl terminated polyester is typically in the range of about 700 to about 5,000, and often is in the range of about 700 to about 4,000. The number average molecular weight can be determined, for example, by assay of the number of terminal functional groups for a given weight of polymer, Suitable hydroxyl terminated polyesters generally have an acid number of 1.3 or less and typically 0.8 or less. The acid number refers to the number of milligrams of potassium hydroxide needed to neutralize one gram of the hydroxyl terminated polyester. Suitable hydroxyl terminated polyesters are commercially available from companies such as, for example, Witco Corp. of Perth Amboy, N.J. as Fomrez, Inolex Chemical Co. of Philadelphia, Pa. as Lexorez, and Ruco Polymer Corp. of Hicksville, N.Y. as Rucofeld.

The hydroxyl terminated polyester polymers can be produced by, for example, (1) an esterification reaction of one or more dicarboxylic acids or anhydrides using one or more glycols or (2) a transesterification reaction of one of more esters of dicarboxylic acids using one or more glycols. Mole ratios generally in excess of more than one mole of glycol to acid, anhydride, or ester are preferred so as to obtain linear chains having a preponderance of terminal hydroxyl groups.

Suitable dicarboxylic acids for preparing a hydroxyl terminated polyester intermediate include aliphatic, cycloaliphatic, and aromatic dicarboxylic acids. A single dicarboxylic acid or a combination of dicarboxylic acids can be used. Typically, the dicarboxylic acids have a total of from 4 to about 15 carbon atoms. Examples of suitable dicarboxylic acids include succinic, glutaric, adipic, pimelic, suberic, azelaic, sebacic, dodecanedioic, isophthalic, terephthalic, and cyclohexane dicarboxylic acids, and the like. Anhydrides of the above dicarboxylic acids, such as phthalic anhydride, tetrahydrophthalic anhydride, and the like, can also be used. Adipic acid is a commonly used dicarboxylic acid.

If the transesterification route for formation of the hydroxyl terminated polyester is utilized, esters of the dicarboxylic acids described above can be used. These esters typically include an alkyl group, usually having 1 to 6 carbon atoms, in place of the acidic hydrogen of the corresponding acid functionalities.

The glycols which are reacted to form the hydroxyl terminated polyester intermediate can be aliphatic, aromatic, or combinations thereof. The glycols typically have a total of from 2 to 12 carbon atoms. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Commonly used glycols are 1,4-butanediol and 1,6-hexanediol.

The class of hydroxyl terminated polyether polyols are derived from a diol or polyol having a total of from 2 to about 15 carbon atoms. For example, an alkyl diol or glycol can be reacted with an ether, such as an alkylene oxide having from 2 to 6 carbon atoms. Suitable alkylene oxides include, for example, ethylene oxide, propylene oxide, or mixtures thereof. Suitable hydroxyl terminated polyethers are commercially available from companies such as, for example, E. I. DuPont de Nemours Co., Inc. of Wilmington, Del. as Terathane, BASF Corp. of Parsippany, N.J. as poly THF and Penn Specialties of Philadelphia, Pa. as Polymeg.

Suitable polyether polyols include, for example, poly (ethylene glycol) which can be formed by reacting ethylene oxide with ethylene glycol, poly(propylene glycol) which can be formed by reacting propylene oxide with propylene glycol, poly(propylene-ethylene glycol) which can be formed by reacting propylene oxide and ethylene oxide with propylene glycol, poly(tetramethylene glycol) (PTMG) which can be formed by reacting water with tetrahydrofuran (THF). Other suitable polyether polyols include polyamide adducts of an alkylene oxide including, for example, ethylenediamine adduct which is the reaction product of ethylenediamine and propylene oxide, diethylenetriamine adduct which is the reaction product of diethylenetriamine with propylene oxide, and similar polyamide type polyether polyols. Co-polyethers can also be utilized in the current invention. Typical co-polyethers include the reaction product of THF and ethylene oxide or THF and propylene oxide. Suitable co polyethers are available from BASF Corp. of Parsippany, N.J. as Poly THF B, a block copolymer, and poly THF R, a random copolymer.

Suitable hydroxyl terminated polyether intermediates generally have a number average molecular weight as determined by assay of the terminal functional groups, of at least 500 and typically no more than 10,000 to produce a desired ratio of soft and hard segments of the polyurethane. Typically, the number average molecular weight of the hydroxyl terminated polyether ranges from about 500 to about 5,000. Often the number average molecular weight of the hydroxyl terminated polyether ranges from about 700 to about 3,000.

The class of hydroxyl terminated polycarbonates are commercially available from Stahl USA of Peabody, Mass. Suitable hydroxyl terminated polycarbonates can be prepared by reacting a glycol with a carbonate. U.S. Pat. No. 4,131,731, incorporated herein by reference, describes hydroxyl terminated polycarbonates, their preparation and how they can be utilized. Such polycarbonates are typically linear. The number average molecular weight of the hydroxyl terminated polycarbonates is generally at least about 500 and typically not more than 3,000.

The class of hydroxyl terminated polycaprolactones are commercially available from companies such as, for example, Union Carbide Corp. of Danbury, Conn. Hydroxyl terminated polycaprolactones can be formed by reaction of a caprolactone with a glycol. Suitable caprolactones include ε-caprolactone and methyl ε-caprolactone. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Methods for the preparation of hydroxyl terminated polycaprolactones are generally known to those of ordinary skill in the art.

The hydroxyl terminated polyolefins are prepared from olefin monomers having from 4 to about 10 or 12 carbon atoms such as butadiene. The number average molecular weight of the hydroxyl terminated polyolefins range from about 500 to about 6,000 or 10,000. The hydroxyl terminated polyolefins are available from Shell as Kraton Liquid L and Mitsubishi Chemical as Polytail H.

The polyol component such as the polyether polyols of the present invention have an unsaturation content of generally less then 0.10 or 0.05 meq/gram, desirably less than about 0.02 or 0.03 meq/gram and preferably less than about 0.015 meq/gram, (milliequivalents per gram) per polyol, as can be determined by methods well known to those skilled in the art. The number average molecular weight of the polyol component of the present invention, which can comprise different polyols as defined above, is generally from about 500 or 600 to about 10,000, desirably from about 700 to about 5,000, and preferably from about 1,000 to about 4,000 per polyol. The average hydroxyl functionality of the polyol component is generally from about 1.8 to about 2.2, desirably from about 1.90 to about 2.10, and preferably from about 1.95 to about 2.00 or 2.05. The polyol component is utilized in the thermoplastic polyurethane composition of the present invention in amounts so that the hydroxyl group content is generally from about 2 to about 70 equivalents, desirably from about 3 to about 65 equivalents, and preferably from about 5 or 10 to about 50 or 60 equivalents per 100 equivalents of the total hydroxyl groups present in the thermoplastic polyurethane composition.

Polyisocyanates

The polyurethanes of the present invention are derived from an isocyanate compound. In order to form large linear polyurethane chains, di-functional or polyfunctional isocyanates are utilized, with diisocyanates being preferred. Suitable polyisocyanates are commercially available from companies such as, but not limited to, Bayer AG of Leverkusen, Germany as Mondur, The BASF Corporation of Parsippany, N.J. as Luprinate, The Dow Chemical Company of Midland, Mich. as Isonate, and Huntsman Chemical of Utah as Rubinate. The polyisocyanates of the present invention generally have a formula $R(NCO)_n$, where n is usually an integer of 2 to 4 and preferably about 2 being preferred. R can be an aromatic, cycloaliphatic, an aliphatic, or combinations thereof having from 2 to 20 carbon atoms. Examples of polyisocyanates include, but are not limited to diphenylmethane-4,4'diisocyanate (MDI); toluene-2,4-diisocyanate (TDI); toluene-2,6-diisocyanate (TDI); methylene bis (4-cyclohexylisocyanate ($H_{12}$ MDI); 3-isocyanatomethyl-3,5,5-trimethyl-cyclohexyl isocyanate (IPDI); 1,6-hexane diisocyanate (HDI); naphthalene-1,5 diisocyanate (NDI); 1,3- and 1,4-phenylenediisocyanate; triphenylmethane-4,4',4"-triisocyanate; polyphenylpolymethylenepolyisocyanate (PMDI); m-xylene diisocyanate (XDI); 1,4-cyclohexyl diisocyanate (CHDI); isophorone diisocyanate; isomers and mixtures or combinations thereof. The preferred isocyanates are aromatic, and include diphenylmethane-4,4'-diisocyanate (MDI), including polymeric MDI, and also $H_{12}$ MDI which produces polyurethanes with low yellow color.

Crystallization Retarding Component

A crystallization retarding component is added to the high crystalline content thermoplastic polyurethanes of the present invention in sufficient amounts to allow the composition to be extruded. That is, while not being bound by theory, it is thought that the crystallization retarding component delays the formation of the crystalline structures for a sufficient amount of time to allow the composition to be processed by extrusion. The onset of crystallization is delayed so that preferably 100% of crystallization occurs after processing of the thermoplastic polyurethane in the extruder, i.e. after the composition leaves or exits the extruder die or orifice.

The crystallization retarding component advantageously lowers or shifts the crystallization temperature of a thermoplastic polyurethane composition when compared to the same compositions without the crystallization retarding component, advantageously allowing the previously unextrudable highly crystallizable compositions to be processed in an extruder. The crystallization retarding components are generally sterically hindered so that crystalline formation is interrupted or delayed allowing the thermoplastic polyurethane to be processed. The crystallization retarding components are short chain or monomeric diols which are branched, substituted and/or contain heteroatoms (atoms other than carbon). If the crystallization retarding component is an aromatic containing diol, the substitution must be other than trans substitution, i.e. there can be substantially no trans-isomers, preferably so that at least some steric hindrance exists in the diol.

Crystallization retarding components include, but are not limited to, dipropylene glycol, tripropylene glycol, diethylene glycol, triethylene glycol, cis-trans-isomers of cyclohexyl dimethylol, neopentyl glycol and substituted alkane diols such as 1,3-butane diol, and 2-methyl-2,4-pentane diol, with dipropylene glycol being preferred. Any branched or substituted alkane diols having from about 2 up to about 12 carbon atoms in the main chain can be utilized. Substituents include alkyl groups, cyclohexyl groups, aryl groups and halogen atoms such as chlorine and bromine.

The crystallization retarding component is utilized in the thermoplastic polyurethane composition of the present invention in amounts so that the hydroxyl group content is generally from about 1 to about 15 or 20 equivalents, desirably from about 2 or 3 to about 15 equivalents, and preferably from about 5 to about 11 or 12 equivalents, per 100 equivalents of the total hydroxyl groups, i.e. from the polyol component, crystallization retarding component, and the chain extending component present in the polyurethane composition. The crystallization retarding components should preferably react at a similar rate as the primary or main chain extenders such as 1,4-butane diol. The molecular weight range for the crystallization retarding component is less than about 450 or 500 number average.

Chain Extenders

Chain extenders are desirably employed in the polyurethane formulations of the present invention generally to increase the molecular weight thereof, and are well known to the art and to the literature. They are also responsible for formation of crystalline hard blocks leading to thermoplastic polyurethanes with desirable mechanical properties. Suitable chain extenders are unbranched, unsubstituted, straight chain alkane diols free of heteroatoms which have a total from about 2 to about 6 carbon atoms. Examples include ethanediol, 1,6-hexanediol, 1,3-propanediol, 1,5-pentanediol and preferably 1,4-butanediol. Suitable chain extenders also include high (trans—trans-)isomers (greater than at least 60%, 75%, 90% or 95%) of substantially non-sterically hindered aromatic glycols such as 1,4-benzenedimethylol benzene glycol, 1,4-cyclopentanediol, and the like. Still other suitable chain extenders are aromatic-aliphatic glycols such as 1,4 bis(2-hydroxyethoxy) benzene (HQEE), and high trans—trans-isomer containing cycloaliphatic glycols such as 1,4-cyclohexanedimethanol (CHDM). Mixtures of the above noted chain extenders can also be utilized.

The preferred chain extenders of the present invention include 1,4-butanediol, ethylene glycol, 1,6-hexane diol, 1,4-cyclohexanedimethanol (CHDM), 1,4 bis(2-hydroxyethoxy) benzene (HQEE), 1,4-benzenedimethylol, 1,3-propane diol, and 1,5-pentane diol. The amount of the one or more chain extenders utilized is based upon the total equivalents of the hydroxyl groups of the reactive components of the thermoplastic polyurethane composition. The amount of chain extender utilized generally is wherein the hydroxyl group content is from about 5 or 10 to about 97 or 99 equivalents, desirably from about 20 to about 95 equivalents, and preferably from about 30 or 40 to about 90 equivalents based on the 100 equivalents of the total hydroxyl groups present in the polyurethane composition.

The equivalent weight ratio of polyisocyanate functional groups to total hydroxyl functional groups of the polyol component, crystallization retarding component, and chain extender is generally from about 0.90 to about 1.10, desirably from about 0.95 to about 1.05, and preferably from about 0.98 to about 1.03.

Catalysts

Catalysts are optionally, but preferably used in the polyurethane reaction mixtures of the present invention. Any of the catalysts conventionally employed or known in the art and to the literature to catalyze the reaction of an isocyanate with a reactive hydrogen containing compound can be employed for this purpose. Such catalysts include organic and inorganic acid salts of, and organometallic derivatives of, bismuth, tin, iron, antimony, cobalt, thorium, aluminum, zinc, nickel, cerium, molybdenum, vanadium, copper, manganese and zirconium, as well as phosphines and tertiary organic amines. Representative organotin catalysts include stannous octoate, dibutyltin dioctoate, dibutyltin diluarate, and the like. Representative tertiary organic amine catalysts include triethylamine, triethylenediamine, N,N,N'N'-tetramethylethylenediamine, N,N,N'N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like.

The amount of catalyst employed is generally within the range of about 20 to about 500 parts by weight per million parts by weight of the total weight of the polyisocyanate(s), polyol component, and chain extender(s). Mixtures of the above noted catalysts can likewise be utilized. It is desirable to use minimal amounts of the catalyst in order to minimize side reactions. Preferred catalysts include stannous octoate, dibutyltin dioctoate, and dibutyltin diluarate and bismuth octoate.

In addition to the above-identified components, the polyurethane compositions of the present invention can also contain various additives, pigments, dyes, fillers and the like, utilized in conventional amounts which are well known to the art and to the literature.

Generally additives are utilized which impart desired properties to the thermoplastic polyurethanes such as various antioxidants, various ultraviolet light inhibitors, waxes such as amide waxes and ester waxes, thickening agents, and the like. The fillers, when utilized, are generally mineral fillers, that is inorganic, and include ground mica, talc, kaolin clay, calcium carbonate, calcium sulfite, colloidal silica, fumed silica, wollastonite, hollow glass microspheres, glass, carbon and graphite fibers, various metallic oxides such as zinc, titanium zirconium, and the like, ground quartz, various metallic silicates, metallic powders such as lead, aluminum, bronze, and the like.

If it is desired that the polyurethane composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the various urethane reactions.

The thermoplastic polyurethane elastomers of the invention can be prepared by processes which are conventional in the art for the synthesis of polyurethane elastomers such as but not limited to a two step prepolymer process or preferably, a one-shot (master batch) technique. In the two-step process, the prepolymer is formed by reacting the polyol component with the polyisocyanate component to form an isocyanate terminated prepolymer which is subsequently chain extended. In the preferred one-shot procedure, all of the reactants are brought together and simultaneously or substantially simultaneously reacted. The one-shot procedure is preferably performed in an extruder, e.g. single screw, twin screw (desired), wherein the formative components, i.e. the polyol(s), the polyisocyanate(s), and the chain extender(s), the catalyst(s), and any other additives, etc., if desired, are introduced individually or as a mixture into the extruder, and reacted at a temperature generally from about 100° C. to about 300° C., desirably from about 150° C. to about 250° C., and preferably from about 150° C. to about 240° C.

The resulting polyurethanes of the present invention have a weight average molecular weight generally from about 50,000 to about 500,000, desirably from about 75,000 to about 250,000, and preferably from about 100,000 to about 150,000, measured by gel permeation chromatography against polystyrene standards. The polyurethanes generally have a hardness which ranges from about 65 Shore A to about 80 D or even harder.

The resulting high crystalline content thermoplastic polyurethane can be extruded into any desired end product or form, or can be cooled and granulated for storage or bulk shipping. The extrudate can also be immediately further processed to give a desired final end-use product.

The high crystalline content thermoplastic polyurethanes of the present invention advantageously are suitable for many applications, including, but not limited to, membranes, breathable films or sheets which can be utilized for house wrap, roofing materials or membranes, tubing, wire and cable jacketing, molded parts, shoe soles, hoses, films for lamination, waistbands, and elastic structures such as fibers.

The present invention will be better understood by reference to the following examples which serve to illustrate the invention, but not to limit the same.

EXAMPLES

The following examples confirm the dramatic effect of the crystallization retarding components on the melt stability of the TPUs. The compositions listed hereinbelow were tested under dynamic conditions (100 radian/second frequency) with a parallel plate melt viscometer according to ASTM D4440-95a over a period of two hours.

Example 1

No crystallization Retarding Component; 31.2% hard segment content.

Example 1

| COMPONENT-REACTIVE | EQ. Wt. | Equi-valents | EqWt*EQ | WT % |
|---|---|---|---|---|
| MDI (polyisocyanate) | 125.20 | 2.93 | 366.64 | 25.08 |
| Butane diol (chain extender) | 45.06 | 1.92 | 86.56 | 5.92 |
| DPG Dipropylene Glycol (crc) | 67.09 | 0.00 | 0.00 | 0.00 |
| PTMEG 2000 (polyol) | 1000.00 | 1.00 | 1000.00 | 68.40 |
| TOTAL OH | | 2.92 | 1086.56 | 74.32 |
| TOTAL OH & NCO | | | 1453.20 | 99.40 |

| COMPONENT-NONREACT | CAL WT | WT % |
|---|---|---|
| Stannous Octoate (catalyst) | 0.07 | 0.01 |
| IRGANOX 1010 | 4.39 | 0.30 |
| Tinuvin 328 | 4.39 | 0.30 |
| TOTAL ADDITIVES | 8.85 | 0.61 |
| TOTAL FOR THE RUN | 1462.04 | 100.00 |

Figure 9:
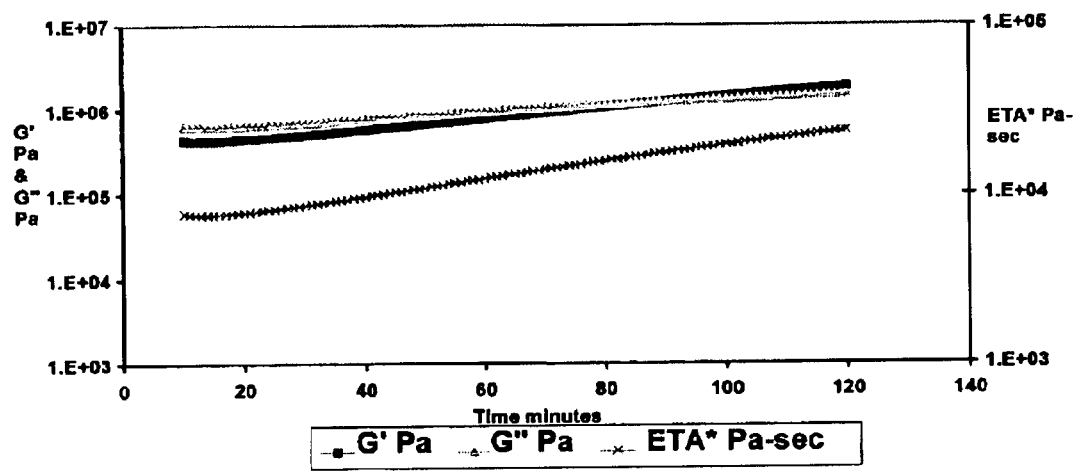
FIGS. 9 through 16 illustrate melt viscosity curves for various polyurethane formulations as set forth in the Example section.

FIG. 9 illustrates a graph of viscosity data calculated from the Example 1 polyurethane formulation. This composition is a TPU of hardness 75 A. With no crystallization retarding component, the complex melt viscosity, ETA*(Pa·sec), gradually increased over the test period of 2 hrs due to the flow restrictions imposed by the crystallization of the hard blocks. The product of this nature is expected to gradually freeze in dead spots of an extruder into solid crystalline structure parts of which will then be release into the melt stream from time to time during the course of the extrusion, spoiling the quality of the extrudate like films, tubing etc. G' is the elastic component of the viscosity and G" is the viscous component of the viscosity.

Example 2

10 Equivalents of Crystallization Retarding Component, Hard Segment Content 31.6%.

Example 2

| COMPONENT-REACTIVE | EQ. Wt. | Equi-valents | EqWt*EQ | WT % |
|---|---|---|---|---|
| MDI (polyisocyanate) | 125.20 | 2.9410 | 368.21 | 24.967 |
| Butane diol (chain extender) | 45.06 | 1.6469 | 74.21 | 5.032 |
| DPG Dipropylene Glycol (crc) | 67.09 | 0.2941 | 19.73 | 1.338 |
| PTMEG 2000 (polyol) | 1000.00 | 1.0000 | 1000.00 | 67.808 |
| TOTAL OH | | 2.9410 | 1093.94 | 74.178 |
| TOTAL OH & NCO | | | 1462.15 | 99.145 |

| COMPONENT-NONREACT | CAL WT | WT % |
|---|---|---|
| Stannous Octoate (catalyst) | 0.07 | 0.005 |
| Acrawax C | 3.69 | 0.250 |
| IRGANOX 1010 | 4.42 | 0.300 |
| Tinuvin 328 | 4.42 | 0.300 |
| TOTAL ADDITIVES | 12.61 | 0.855 |
| TOTAL FOR THE RUN | 1474.76 | 100.00 |

Figure 10:
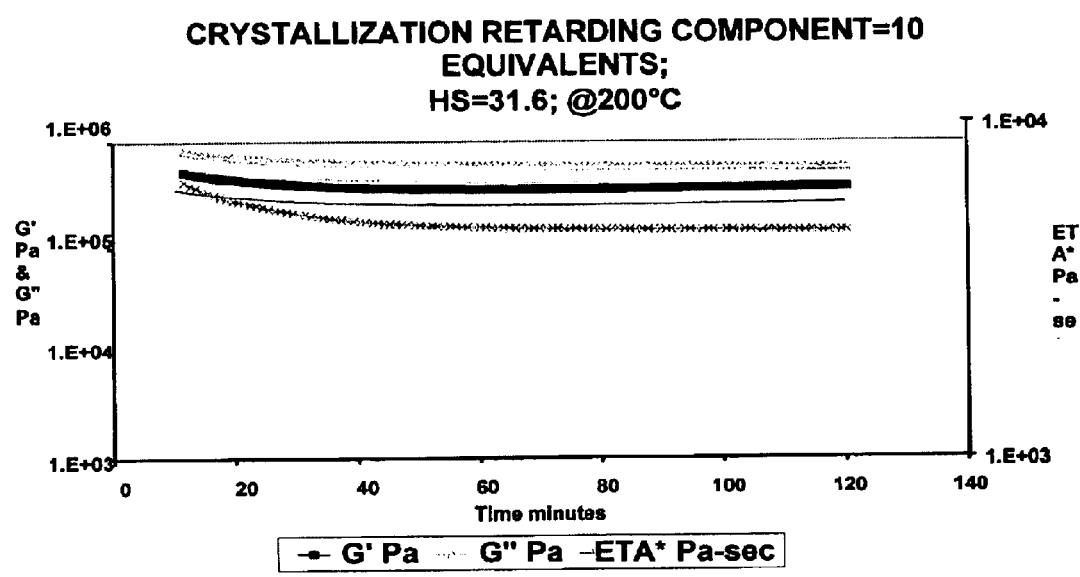

FIG. 10 illustrates a graph of viscosity data calculated from the Example 2 polyurethane formulations. The same test of the same hardness TPU made by replacing 10% of equivalent weight of main chain extender 1,4 butane diol (BDO) with dipropylene glycol (DPG). The test clearly shows that the complex melt viscosity is flatter and does not rise significantly during the course of the test. This indicates good extrusion processibility. To confirm the indicated extrudability, the TPU formulation was scaled up on a pilot reactor (40 mm twin screw Werner Pfleidere extruder) and extruded into excellent quality blown film on a 2½" single screw Killion extruder.

Example 3

0 Equivalents of Crystallization Retarding Component, Hard Segment Content 65.1%.

Example 3

| COMPONENT-REACTIVE | EQ. Wt. | Equi-valents | EqWt*EQ | WT % |
|---|---|---|---|---|
| MDI (polyisocyanate) | 125.20 | 6.9321 | 867.89 | 50.040 |
| Butane diol (chain extender) | 45.06 | 5.6321 | 253.78 | 14.632 |
| PTMEG 1000 (polyol) | 500.00 | 1.0000 | 500.00 | 28.828 |
| PTMEG 650 (polyol) | 335.00 | 0.3000 | 100.50 | 5.794 |
| DPG Dipropylene Glycol (crc) | 67.09 | 0.0000 | 0.00 | 0.000 |
| TOTAL OH | | 6.9321 | 854.28 | 49.255 |
| TOTAL OH & NCO | | | 1722.18 | 99.295 |

| COMPONENT-NONREACT | CAL WT | WT % |
|---|---|---|
| Stannous Octoate (catalyst) | 0.09 | 0.005 |
| IRGANOX 1010 | 6.94 | 0.400 |
| Tinuvin 328 | 5.20 | 0.300 |
| TOTAL ADDITIVES | 12.23 | 0.705 |
| TOTAL FOR THE RUN | 1734.40 | 100.00 |

Figure 11:
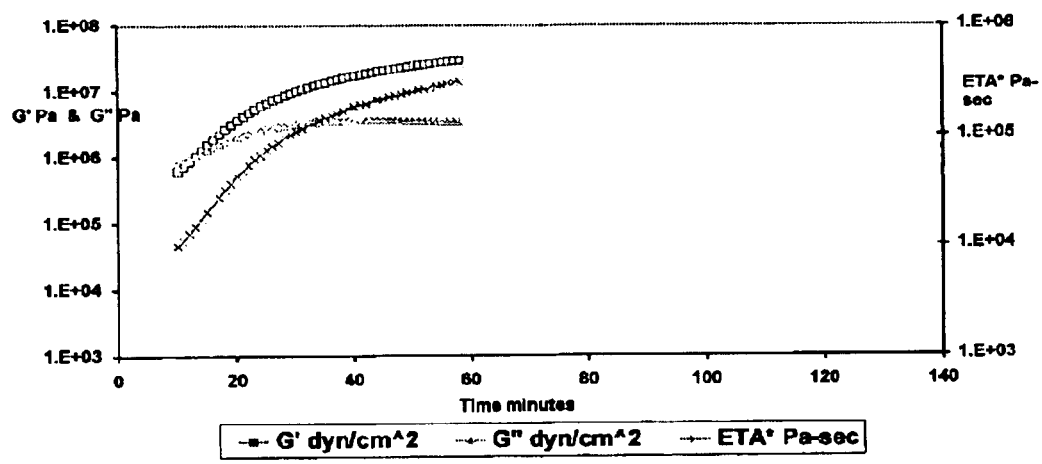

FIG. 11 illustrates a graph of viscosity data calculated from the Example 3 polyurethane formulation. FIG. 11 shows the melt stability of a highly crystalline 65 Shore D hard ether. Rapid increase in complex melt viscosity indicates this product is not suitable for extrusion process. Attempts to extrude this product resulted in significant solidification in die and flight channels of the extruder screw.

Example 4

15 Equivalents of Crystallization Retarding Component, Hard Segment Content 66.6%.

Example 4

| COMPONENT-REACTIVE | EQ. Wt. | Equi-valents | EqWt*EQ | WT % |
|---|---|---|---|---|
| MDI (polyisocyanate) | 125.20 | 7.2115 | 902.88 | 50.040 |
| Butane diol (chain extender) | 45.06 | 4.8298 | 217.63 | 12.062 |
| PTMEG 1000 (polyol) | 498.00 | 1.0000 | 498.00 | 27.601 |
| PTMEG 650 (polyol) | 335.00 | 0.3000 | 100.50 | 5.570 |
| DPG Dipropylene Glycol(crc) | 67.09 | 1.0817 | 72.57 | 4.022 |
| TOTAL OH | | 7.2115 | 888.70 | 49.255 |
| TOTAL OH & NCO | | | 1791.59 | 99.295 |

| COMPONENT-NONREACT | CAL WT | WT % |
|---|---|---|
| Stannous Octoate (catalyst) | 0.09 | 0.005 |
| IRGANOX 1010 | 7.22 | 0.400 |
| Tinuvin 328 | 5.41 | 0.300 |
| TOTAL ADDITIVES | 12.72 | 0.705 |
| TOTAL FOR THE RUN | 1804.31 | 100.00 |

Figure 12:
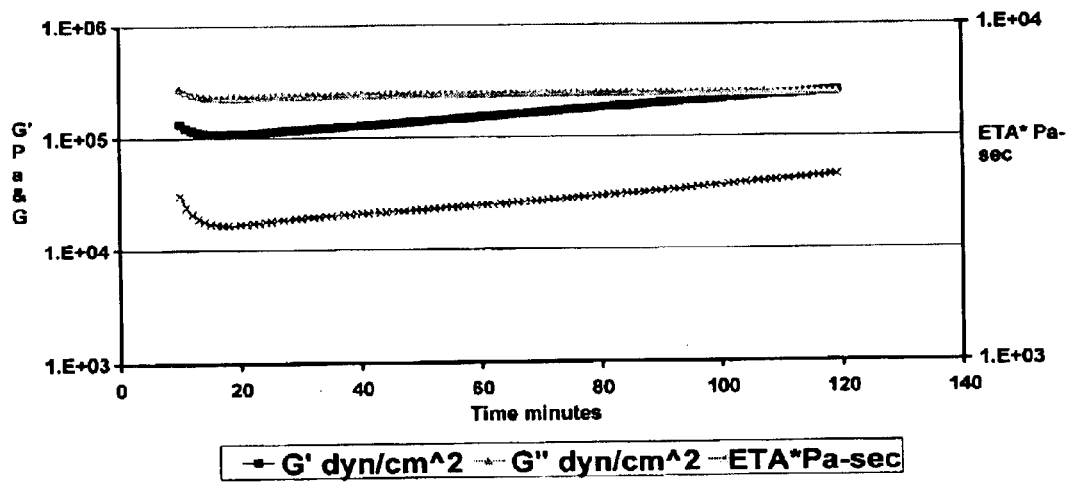

FIG. 12 illustrates a graph of viscosity data calculated from the Example 4 polyurethane formulation. FIG. 12 shows the melt stability of the similar ether product of Example 3 modified with 15 equivalents of dipropylene glycol (DPG). The increase in melt viscosity is mild and gradual. This material was extruded successfully into tubing and sheets on a 2½" Killion extruder.

Example 5

0 Equivalents of Crystallization Retarding Component, Hard Segment Content 58.9%.

Example 5

| COMPONENT-REACTIVE | EQ. Wt. | Equi-valents | EqWt*EQ | WT % |
|---|---|---|---|---|
| MDI (polyisocyanate) | 125.20 | 13.1205 | 1642.69 | 43.789 |
| BDO (chain extender) | 45.06 | 12.1205 | 546.15 | 14.559 |
| Ester Polyol (polyol) | 1525.00 | 1.0000 | 1525.00 | 40.652 |
| TOTAL OH | | 13.1205 | 2071.15 | 55.211 |
| TOTAL OH & NCO | | | 3713.84 | 99.000 |

| COMPONENT-NONREACT | CAL WT | WT % |
|---|---|---|
| ACRAWAX C | 9.38 | 0.250 |
| IRGANOX 1010 | 9.38 | 0.250 |
| Stabaxol P-200 | 18.76 | 0.500 |
| TOTAL ADDITIVES | 37.51 | 1.000 |
| TOTALS FOR THE RUN | 3751.36 | 100.000 |

Figure 13:
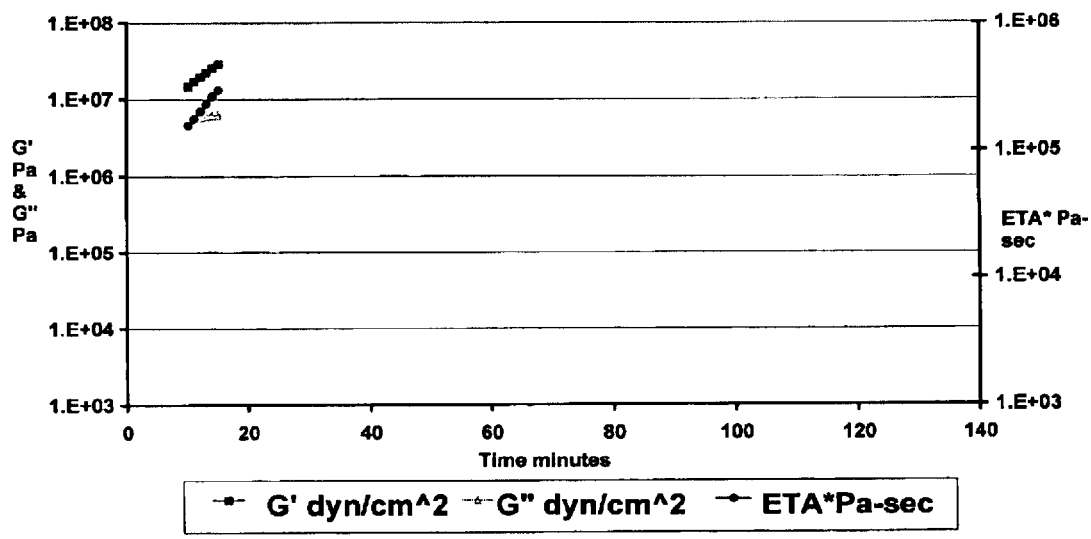

FIG. 13 illustrates a graph of viscosity data calculated from the Example 5 polyurethane formulation. FIG. 13 shows the melt curves of a highly crystalline 55 D ester polyol based TPU. The rapid increase in viscosity due to crystallization exceeds the capacity of the viscometer machine to complete the test after 25 minutes. This product could not be extruded in an extruder.

Example 6

10 Equivalents of Crystallization Retarding Component, Hard Segment Content 59.7%.

Example 6

| COMPONENT-REACTIVE | EQ. Wt. | Equi-valents | EqWt*EQ | WT % |
|---|---|---|---|---|
| MDI (polyisocyanate) | 125.20 | 13.382 | 1675.40 | 43.811 |
| BDO (chain extender) | 45.06 | 11.044 | 497.62 | 13.013 |
| Ester Polyol (polyol) | 1525.00 | 1.000 | 1525.00 | 39.878 |
| Dipropylene Glycol DPG(crc) | 67.09 | 1.338 | 89.78 | 2.348 |
| TOTAL OH | | 13.382 | 2112.40 | 55.239 |
| TOTAL OH & NCO | | | 3787.80 | 99.050 |

| COMPONENT-NONREACT | CAL WT | WT % |
|---|---|---|
| ACRAWAX C | 7.65 | 0.200 |
| IRGANOX 1010 | 9.56 | 0.250 |
| Stabaxol P-200 | 19.12 | 0.500 |
| TOTAL ADDITIVES | 36.33 | 0.950 |
| TOTALS FOR THE RUN | 3824.13 | 100.000 |

Figure 14:
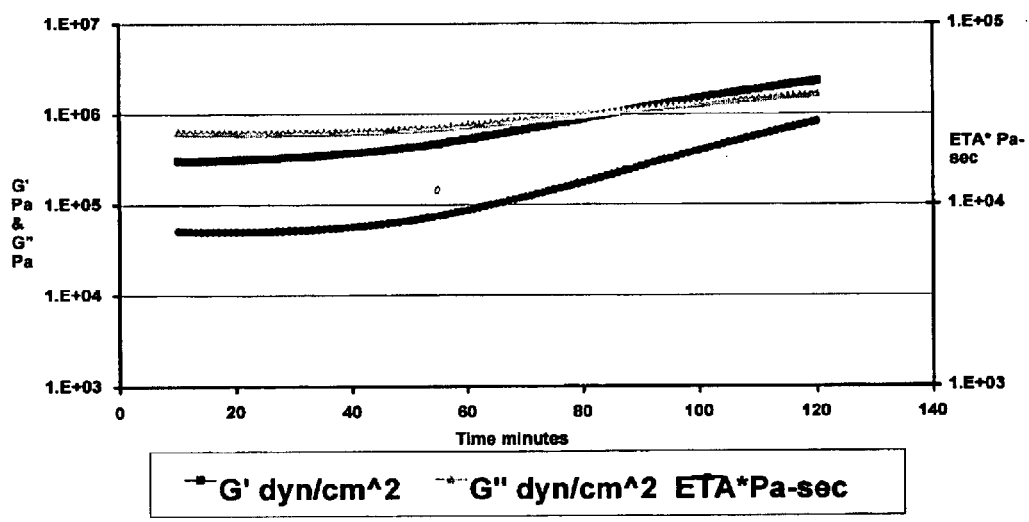

FIG. 14 illustrates a graph of viscosity data calculated from the Example 6 polyurethane formulation. The melt curves shown in FIG. 14 is the ester product of Example 5 modified with 10 equivalents of dipropylene glycol (DPG). This product was successfully extruded into tubing on a 2½" Killion extruder.

Example 7

0 Equivalents of Crystallization Retarding Component, Hard Segment Content 48.4%.

Example 7

| COMPONENT-REACTIVE | EQ. Wt. | Equi-valents | EqWt*EQ | WT % |
|---|---|---|---|---|
| MDI (polyisocyanate) | 125.20 | 13.1225 | 1642.94 | 39.938 |
| BDO (chain extender) | 27.19 | 12.1225 | 329.62 | 8.013 |
| Ester Polyol (polyol) | 2100.00 | 1.0000 | 2100.00 | 51.049 |
| Dipropylene Glycol DPG (crc) | 67.09 | 0.0000 | 0.00 | 0.000 |
| TOTAL OH | | 13.1225 | 2429.62 | 59.062 |
| TOTAL OH & NCO | | | 4072.55 | 99.000 |

| COMPONENT-NONREACT | CAL WT | WT % |
|---|---|---|
| ACRAWAX C | 10.28 | 0.250 |
| IRGANOX 1010 | 10.28 | 0.250 |
| Stabaxol P-200 | 20.57 | 0.500 |
| TOTAL ADDITIVES | 41.14 | 1.000 |
| TOTALS FOR THE RUN | 4113.69 | 100.000 |

Figure 15:
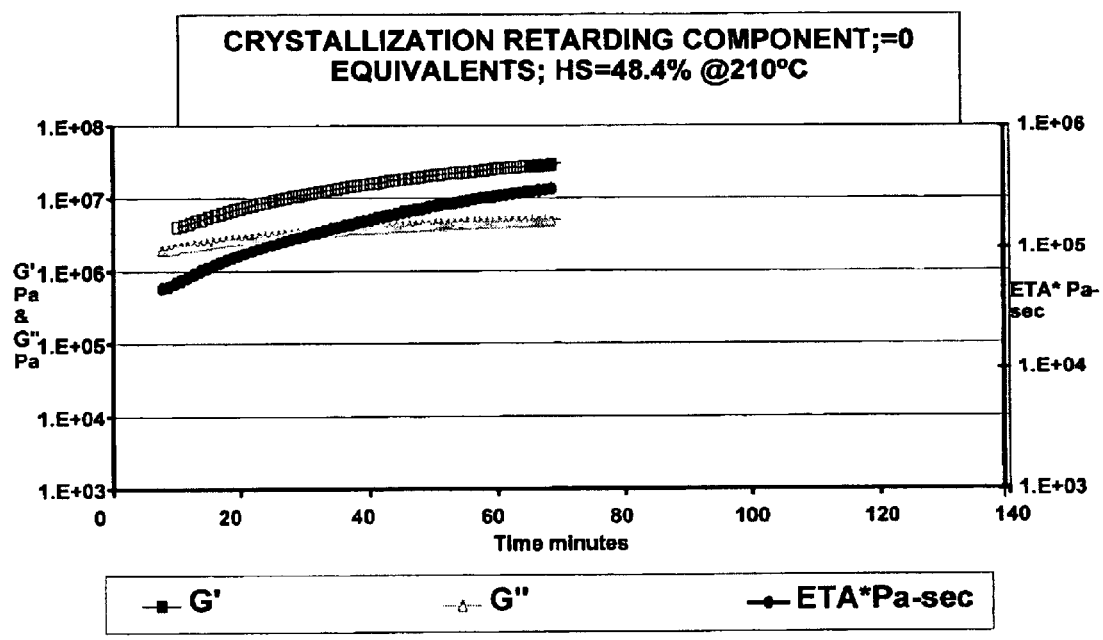
Figure 16:
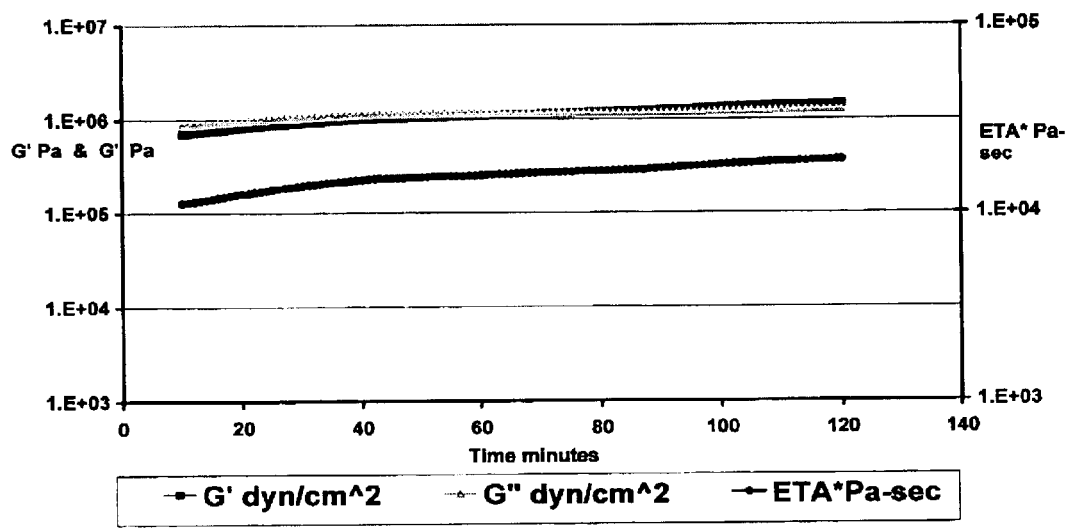

FIG. 15 illustrates a graph of viscosity data calculated from the Example 7 polyurethane formulation. FIG. 15 shows the melt viscosity curve of an unmodified highly crystalline ester of 50 D hardness. As in earlier comparisons the product in chart 7 was not extrudable whereas the modified product in FIG. 16 generated from the polyurethane formulation of Example 8 extrudes easily.

Example 8

10 Equivalents of Crystallization Retarding Component, Hard Segment Content 54.6%.

Example 8

| COMPONENT-REACTIVE | EQ. Wt. | Equi-valents | EqWt*EQ | WT % |
|---|---|---|---|---|
| MDI (polyisocyanate) | 125.20 | 14.9032 | 1865.88 | 39.938 |
| BDO (chain extender) | 45.06 | 12.4129 | 559.32 | 11.972 |
| Ester Polyol (polyol) | 2100.00 | 1.0000 | 2100.00 | 44.950 |
| Dipropylene Glycol DPG (crc) | 67.09 | 1.4903 | 99.99 | 2.140 |
| TOTAL OH | | 14.9032 | 2759.31 | 59.062 |
| TOTAL OH & NCO | | | 4625.19 | 99.000 |

| COMPONENT-NONREACT | CAL WT | WT % |
|---|---|---|
| ACRAWAX C | 11.68 | 0.250 |
| IRGANOX 1010 | 11.68 | 0.250 |
| Stabaxol P-200 | 23.36 | 0.500 |
| TOTAL ADDITIVES | 46.72 | 1.000 |
| TOTALS FOR THE RUN | 4671.91 | 100.000 |

The following compositions were analyzed by DSC to illustrate the effect of the crystallization composition of the present invention.

Formulation for FIG. 1 (DSC), No Crystallization Retarding Component

Formulation for FIG. 1 (DSC), Crystallization Retarding Component

| COMPONENT-REACTIVE | EQ. Wt. | Equi-valents | EqWt*EQ | WT % |
|---|---|---|---|---|
| MDI (polyisocyanate) | 125.20 | 13.1205 | 1642.69 | 43.789 |
| BDO (chain extender) | 45.06 | 12.1205 | 546.15 | 14.559 |
| Ester Polyol (polyol) | 1525.00 | 1.0000 | 1525.00 | 40.652 |
| Dipropylene Glycol DPG (crc) | 0.00 | 0.0000 | 0.00 | 0.000 |
| TOTAL OH | | 13.1205 | 2071.15 | 55.211 |
| TOTAL OH & NCO | | | 3713.84 | 99.000 |

| COMPONENT-NONREACT | CAL WT | WT % |
|---|---|---|
| ACRAWAX C | 9.38 | 0.250 |
| IRGANOX 1010 | 9.38 | 0.250 |
| Stabaxol P-200 | 18.76 | 0.500 |
| TOTAL ADDITIVES | 37.51 | 1.000 |
| TOTALS FOR THE RUN | 3751.36 | 100.000 |

Figure 2:
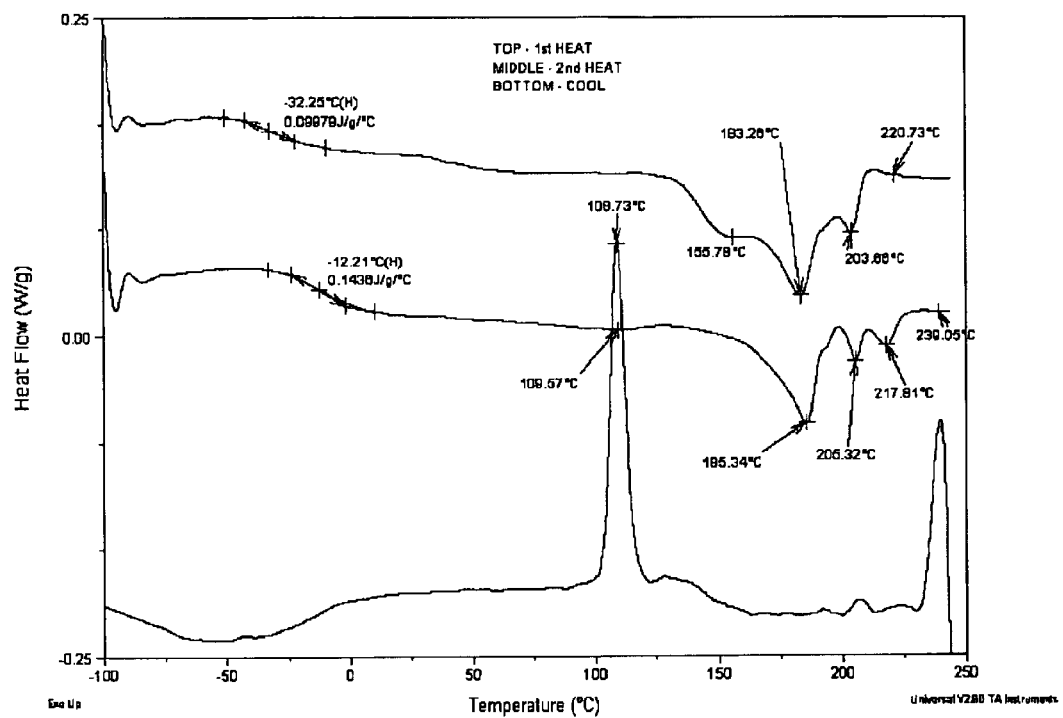

Formulation for FIG. 2 (DSC), 10 Equivalents of Crystallization Retarding Components per 100 OH Equivalents Formulation for FIG. 2 (DSC), 10 Equivalents of Crystallization Retarding Components per 100 OH Equivalents

| COMPONENT-REACTIVE | EQ. Wt. | Equi-valents | EqWt*EQ | WT % |
|---|---|---|---|---|
| MDI (polyisocyanate) | 125.20 | 13.382 | 1675.40 | 43.811 |
| BDO (chain extender) | 45.06 | 11.044 | 497.62 | 13.013 |
| Ester Polyol (polyol) | 1525.00 | 1.0000 | 1525.00 | 39.878 |
| Dipropylene Glycol DPG (crc) | 67.09 | 1.338 | 89.78 | 2.348 |
| TOTAL OH | | 13.382 | 2112.40 | 55.239 |
| TOTAL OH & NCO | | | 3787.80 | 99.050 |

| COMPONENT-NONREACT | CAL WT | WT % |
|---|---|---|
| ACRAWAX C | 7.65 | 0.200 |
| IRGANOX 1010 | 9.56 | 0.250 |
| Stabaxol P-200 | 19.12 | 0.500 |
| TOTAL ADDITIVES | 36.33 | 0.950 |
| TOTALS FOR THE RUN | 3824.13 | 100.000 |

Figure 3:
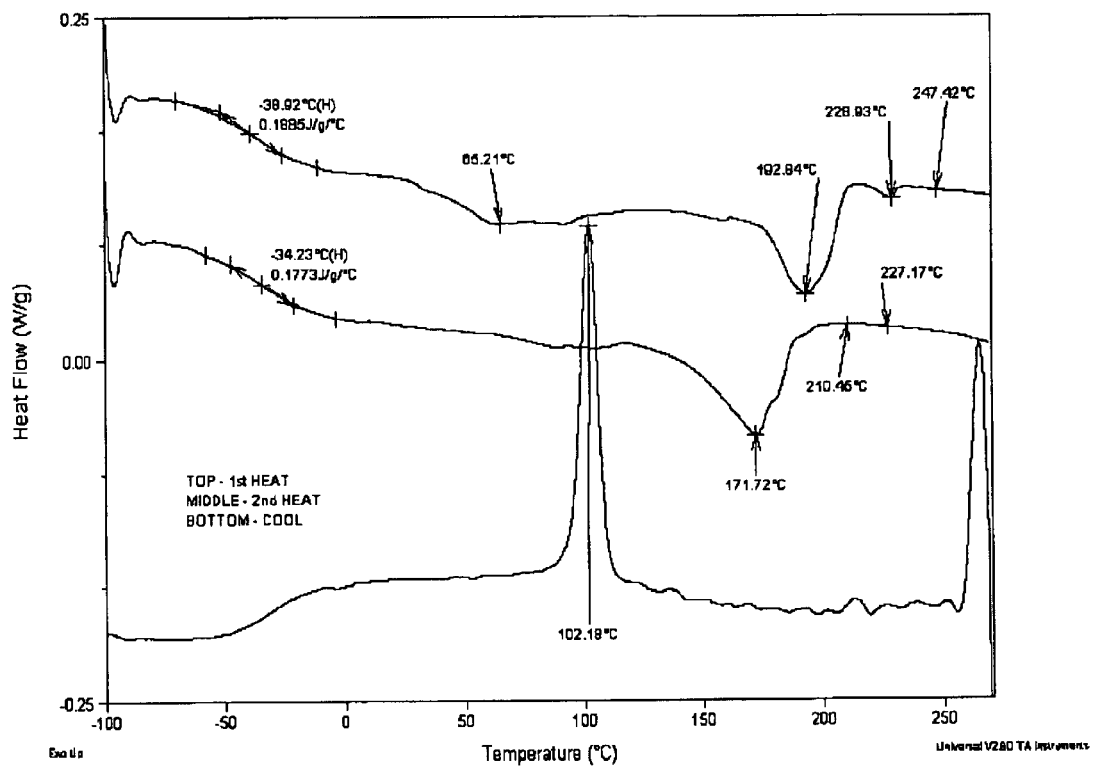

Formulation for FIG. 3 (DSC), No Crystallization Retarding Component

Formulation for FIG. 3 (DSC), No Crystallization Retarding Component

| COMPONENT-REACTIVE | EQ. Wt. | Equi-valents | EqWt*EQ | WT % |
|---|---|---|---|---|
| MDI (polyisocyanate) | 125.20 | 3.4965 | 437.77 | 41.430 |
| BDO (chain extender) | 45.06 | 2.4965 | 112.49 | 10.646 |
| PTMEG 1000 | 500.00 | 1.0000 | 500.00 | 47.319 |
| Dipropylene Glycol DPG (crc) | 67.09 | 0.0000 | 0.00 | 0.000 |
| TOTAL OH | | 3.4965 | 612.49 | 57.965 |
| TOTAL OH & NCO | | | 1050.26 | 99.395 |

| COMPONENT-NONREACT | CAL WT | WT % |
|---|---|---|
| Stannous Octoate | 0.05 | 0.005 |
| IRGANOX 1010 | 3.17 | 0.300 |
| Tinuvin 328 | 3.17 | 0.300 |
| TOTALS FOR THE RUN | 1056.65 | 100.000 |

Figure 4:
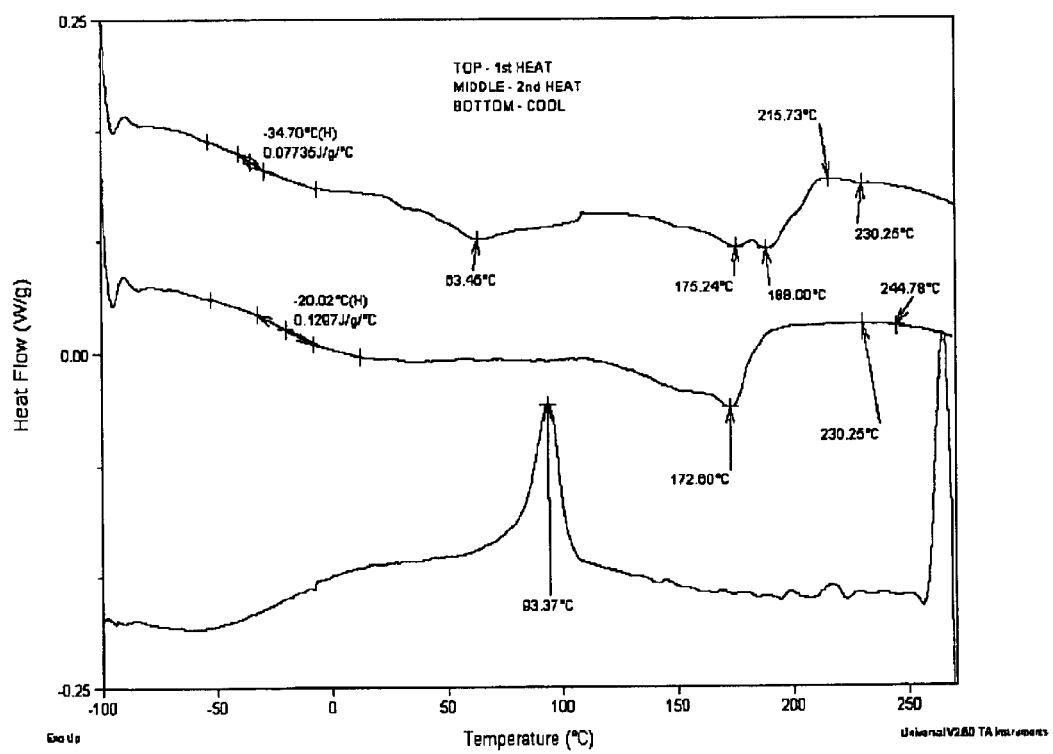

Formulation for FIG. 4 (DSC), 8.8 Equivalents of Crystallization Retarding Components per 100 OH Equivalents Formulation for FIG. 4 (DSC), 8.8 Equivalents of Crystallization Retarding Components per 100 OH Equivalents

| COMPONENT-REACTIVE | EQ. Wt. | Equi-valents | EqWt*EQ | WT % |
|---|---|---|---|---|
| MDI (polyisocyanate) | 125.20 | 3.6856 | 461.44 | 42.187 |
| Butane diol (chain extender) | 45.06 | 2.3529 | 106.02 | 9.693 |
| PTMEG 1000 (polyol) | 498.00 | 1.0000 | 498.00 | 45.530 |
| Dipropylene Glycol DPG (crc) | 67.09 | 0.3235 | 21.71 | 1.984 |
| TOTAL OH | | 3.6764 | 625.73 | 57.208 |
| TOTAL OH & NCO | | | 1087.17 | 99.395 |

| COMPONENT-NONREACT | CAL WT | WT % |
|---|---|---|
| Stannous Octoate (catalyst) | 0.05 | 0.005 |
| IRGANOX 1010 | 3.28 | 0.300 |
| Tinuvin 328 | 3.28 | 0.300 |
| Total Nonreactants | 6.62 | 0.605 |
| TOTAL FOR RUN | 1093.78 | 100.000 |

Figure 5:
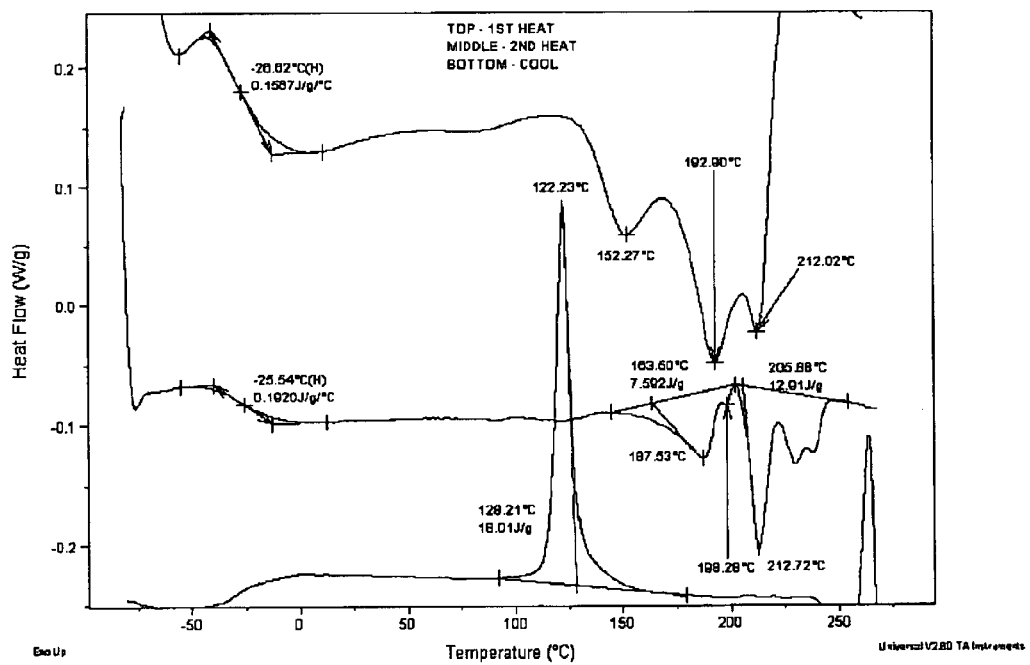

Formulation for FIG. 5 (DSC), No Crystallization Retarding Component=0 Equivalents Formulation for FIG. 5 (DSC), No Crystallization Retarding Component = 0 Equivalents

| COMPONENT-REACTIVE | EQ. Wt. | Equi-valents | EqWt*EQ | WT % |
|---|---|---|---|---|
| MDI (polyisocyanate) | 125.20 | 13.1225 | 1642.94 | 39.938 |
| BDO (chain extender) | 27.19 | 12.1225 | 329.62 | 8.013 |
| Ester Polyol (polyol) | 2100.00 | 1.0000 | 2100.00 | 51.049 |

-continued

Formulation for FIG. 5 (DSC), No Crystallization Retarding Component = 0 Equivalents

| Dipropylene Glycol DPG (crc) | 67.09 | 0.0000 | 0.00 | 0.000 |
|---|---|---|---|---|
| TOTAL OH | | 13.1225 | 2429.62 | 59.062 |
| TOTAL OH & NCO | | | 4072.55 | 99.000 |

| COMPONENT-NONREACT | CAL WT | WT % |
|---|---|---|
| ACRAWAX C | 10.28 | 0.250 |
| IRGANOX 1010 | 10.28 | 0.250 |
| Stabaxol P-200 | 20.57 | 0.500 |
| | 41.14 | 1.000 |
| Totals for Run | 4113.69 | 100.000 |

Figure 6:
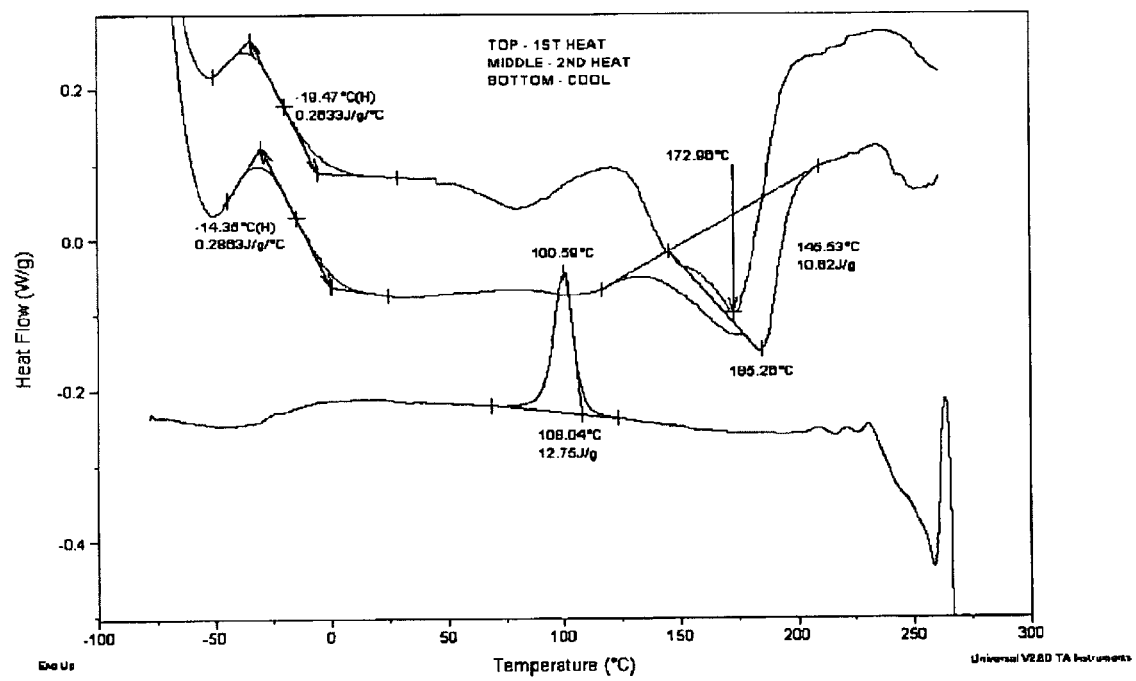

Formulation for FIG. 6 (DSC), 10 Equivalents of Crystallization Retarding Components per 100 OH Equivalents

| COMPONENT-REACTIVE | EQ. Wt. | Equi-valents | EqWt*EQ | WT % |
|---|---|---|---|---|
| MDI (polyisocyanate) | 125.20 | 14.9032 | 1865.88 | 39.938 |
| BDO (chain extender) | 45.06 | 12.4129 | 559.32 | 11.972 |
| Ester Polyol (polyol) | 2100.00 | 1.0000 | 2100.00 | 44.950 |
| Dipropylene Glycol DPG (crc) | 67.09 | 1.4903 | 99.99 | 2.140 |
| TOTAL OH | | 14.9032 | 2759.31 | 59.062 |
| TOTAL OH & NCO | | | 4625.19 | 99.000 |

| COMPONENT-NONREACT | CAL WT | WT % |
|---|---|---|
| ACRAWAX C | 11.68 | 0.250 |
| IRGANOX 1010 | 11.68 | 0.250 |
| Stabaxol P-200 | 23.36 | 0.500 |
| | 46.72 | 1.000 |
| Totals for the Run | 4671.91 | 100.000 |

Figure 7:
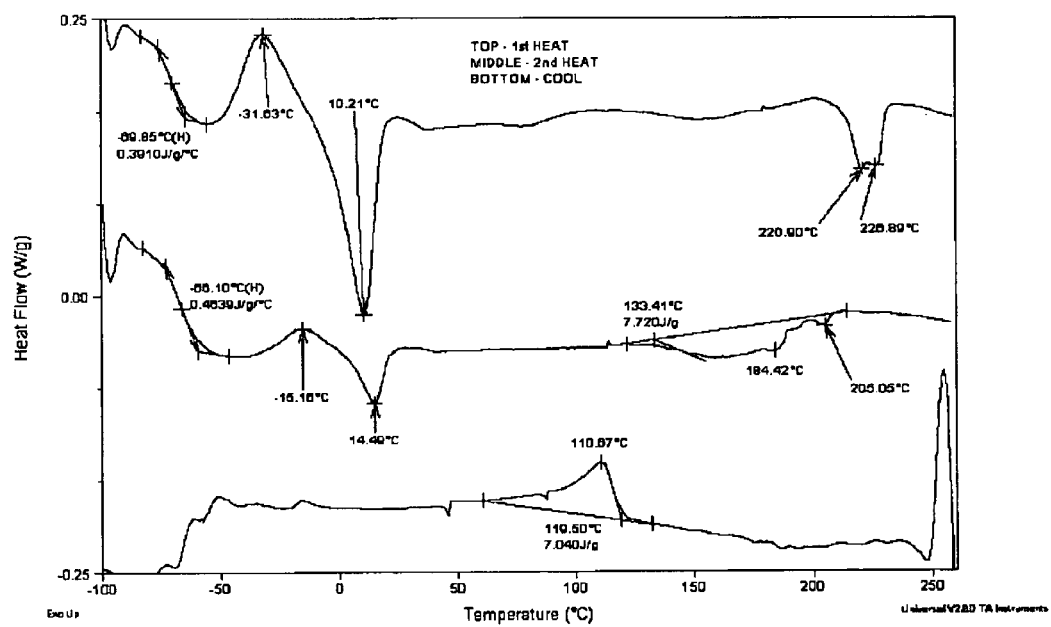

Formulation for FIG. 7 (DSC), No Crystallization Retarding Component=0 Equivalents

| COMPONENT-REACTIVE | EQ. Wt. | Equi-valents | EqWt*EQ | WT % |
|---|---|---|---|---|
| MDI (polyisocyanate) | 125.20 | 2.93 | 366.64 | 25.08 |
| Butane diol (chain extender) | 45.06 | 1.92 | 86.56 | 5.92 |
| DPG Dipropylene Glycol (crc) | 67.09 | 0.00 | 0.00 | 0.00 |
| PTMEG 2000 (polyol) | 1000.00 | 1.00 | 1000.00 | 68.40 |
| TOTAL OH | | 2.92 | 1086.56 | 74.32 |
| TOTAL OH & NCO | | | 1453.20 | 99.40 |

| COMPONENT-NONREACT | CAL WT | WT % |
|---|---|---|
| Stannous Octoate (catalyst) | 0.07 | 0.01 |
| Acrawax C | 0.00 | 0.00 |
| IRGANOX 1010 | 4.39 | 0.30 |
| Tinuvin 328 | 4.39 | 0.30 |
| | 8.85 | 0.61 |
| TOTAL FOR RUN | 1462.04 | 100.00 |

Figure 8:
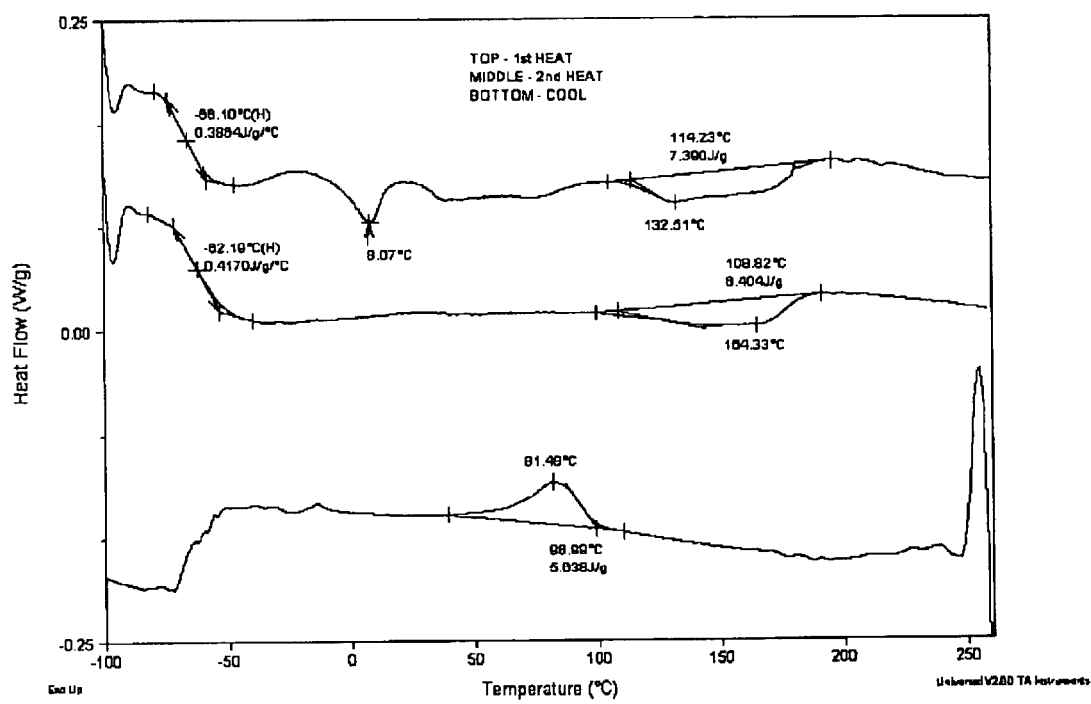

Formulation for FIG. 8 (DSC), 10 Equivalents of Crystallization Retarding Components per 100 OH Equivalents

| COMPONENT-REACTIVE | EQ. Wt. | Equi-valents | EqWt*EQ | WT % |
|---|---|---|---|---|
| MDI (polyisocyanate) | 125.20 | 2.9410 | 368.21 | 24.967 |
| Butane diol (chain extender) | 45.06 | 1.6469 | 74.21 | 5.032 |
| DPG Dipropylene Glycol (crc) | 67.09 | 0.2941 | 19.73 | 1.338 |
| PTMEG 2000 (polyol) | 1000.00 | 1.0000 | 1000.00 | 67.808 |
| TOTAL OH | | 2.9410 | 1093.94 | 74.178 |
| TOTAL OH & NCO | | | 1462.15 | 99.145 |

| COMPONENT-NONREACT | CAL WT | WT % |
|---|---|---|
| Stannous Octoate (catalyst) | 0.07 | 0.005 |
| Acrawax C | 3.69 | 0.250 |
| IRGANOX 1010 | 4.42 | 0.300 |
| Tinuvin 328 | 4.42 | 0.300 |
| | 12.61 | 0.855 |
| TOTAL FOR RUN | 1474.76 | 100.00 |

FIG. 1 shows the DSC scan of an ester TPU without DPG modifier. Relative rate of crystallization is indicated by the peak of crystallization temperature Tc at 121.6° C. and 136.2° C. the higher the peak temperature, the faster the crystallization rate is. The more perfect the crystal the higher the peak. In FIG. 2 this peak is reduced to 108.7° C. by replacing 10% of total OH with DPG as chain extender. Also the relative intensity of the highest melting peak of the rescan (shown by the middle curve) can be used to anticipate potential extrusion problems. The larger and more intense this peak is, the more difficult will be the extrusion processability of TPU because of premature crystallization of the product inside the extruder. FIG. 1 shows this peak at 222.4° C. and more intense than the same peak in FIG. 2 at 217.8° C. Analyzing the DSC curves of FIG. 1 and FIG. 2 we can therefore say that TPU in FIG. 2 will be easier to extrude than TPU in FIG. 1.

Applying the same analysis to the TPUs shown in FIGS. 3 through 8, we can surmise CRC modified TPU in FIGS. 4, 6, and 8 will extrude easier than unmodified TPU shown in FIGS. 3, 5, and 7 respectively.

What is claimed is:

1. An extruded thermoplastic polyurethane composition having a high crystalline content comprising the reaction product of:
   a polyol component, wherein said polyol component has a number average molecular weight of about 500 to about 10,000 per polyol;
   a polyisocyanate component;
   a chain extender component, wherein said chain extender component is an unbranched, unsubstituted, straight chain diol;
   a crystallization retarding component, wherein said crystallization retarding component is a diol which is branched, substituted or contains at least one heteroatom, or a combination thereof, wherein if said diol contains an aromatic group there is no trans—trans-isomers; and
   optionally, a polyurethane catalyst;
   wherein said composition has been extruded, and wherein said composition has a hard segment content of at least 20%.

2. A composition according to claim 1, wherein the crystallization retarding component is utilized in an amount so that the hydroxyl group content is from about 1 to about equivalents per 100 equivalents of the total hydroxyl groups of the polyol component, the chain extender component and the crystallization retarding component.

3. A composition according to claim 1, wherein said crystallization retarding component is dipropylene glycol, tripropylene glycol, diethylene glycol, triethylene glycol, neopentyl glycol, 1,3-butane diol, 2-methyl-2,4-pentane diol, or a combination thereof.

4. A composition according to claim 2, wherein said polyol component comprises hydroxyl terminated polyesters, hydroxyl terminated polyethers, hydroxyl terminated polycarbonates, hydroxyl terminated polycaprolactams, hydroxyl terminated polyolefins, hydroxyl terminated polyacrylates, or a combination thereof, and wherein said polyol component is utilized in an amount so that the hydroxyl group content is generally from about 2 to about 70 equivalents per 100 equivalents of the total hydroxyl groups present in the composition.

5. A composition according to claim 2, wherein said polyisocyanate component comprises diphenylmethane-4,4'-diisocyanate.

6. A composition according to claim 2, wherein the equivalent weight ratio of polyisocyanate functional groups to total hydroxyl functional groups of the polyol component crystallization retarding component and the chain extender component is from about 0.90 to about 1.10.

7. A composition according to claim 1, wherein said composition has a hard segment content of about 30% to about 90%.

8. A composition according to claim 2, wherein the crystallization retarding component is utilized in an amount so that the hydroxyl group content is from about 2 to about 12 equivalents per 100 equivalents of the total hydroxyl groups of the polyol component, the chain extender component and the crystallization retarding component.

9. A composition according to claim 3, wherein said crystallization retarding component is dipropylene glycol.

10. A composition according to claim 4, wherein said chain extender component is 1,4'-butanediol, ethylene glycol, 1,6-hexanediol, 1,4'-cyclohexanedimethanol, 1,3'-propanediol, and 1,5'-pentanediol, or combinations thereof.

11. A composition according to claim 1, wherein said catalyst is present and comprises stannous octoate, dibutyltin dioctoate, dibutyltin diluarate, bismuth octoate, or a combination thereof.

12. A composition according to claim 1, wherein said composition has been extruded into a membrane, breathable film, sheet, tubing, wire, cable jacketing, shoe sole, hose, or a fiber.

13. An extruded thermoplastic polyurethane composition having a high crystalline content comprising the reaction product of:
a polyol component, wherein said polyol component has a number average molecular weight of about 500 to about 10,000 per polyol;
a polyisocyanate component;
a chain extender component, wherein said chain extender component is an unsubstituted, straight chain diol;
a crystallization retarding component, wherein said crystallization retarding component is a diol which is branched, substituted or contains at least one heteroatom, or a combination thereof, wherein if said diol contains an aromatic group there is no trans—trans-isomers; and
optionally, a polyurethane catalyst;
wherein said composition has been extruded, and wherein said composition has greater than about 4 J/g heat of crystallization exotherm during cool down from melt.

14. A composition according to claim 13, wherein the crystallization retarding component is utilized in an amount so that the hydroxyl group content is from about 1 to about 15 equivalents per 100 equivalents of the total hydroxyl groups of the polyol component, the chain extender component and the crystallization retarding component.

15. A composition according to claim 13, wherein said crystallization retarding component is dipropylene glycol, tripropylene glycol, diethylene glycol, triethylene glycol, neopentyl glycol, 1,3-butane diol, 2-methyl-2,4-pentane diol, or a combination thereof.

16. A composition according to claim 14, wherein said polyol component comprises hydroxyl terminated polyesters, hydroxyl terminated polyethers, hydroxyl terminated polycarbonates, hydroxyl terminated polycaprolactams, hydroxyl terminated polyolefins, hydroxyl terminated polyacrylates, or a combination thereof, and wherein said polyol component is utilized in an amount so that the hydroxyl group content is generally from about 2 to about 70 equivalents per 100 equivalents of the total hydroxyl groups present in the composition.

17. A composition according to claim 14, wherein said polyisocyanate component comprises diphenylmethane-4,4'-diisocyanate.

18. A composition according to claim 14, wherein the equivalent weight ratio of polyisocyanate functional groups to total hydroxyl functional groups of the polyol component crystallization retarding component and the chain extender component is from about 0.90 to about 1.10.

19. A composition according to claim 13, wherein said composition has about 5 to about 40 J/g heat of crystallization exotherm during cool down from melt.

20. A composition according to claim 14, wherein the crystallization retarding component is utilized in an amount so that the hydroxyl group content is from about 3 to about 12 equivalents per 100 equivalents of the total hydroxyl groups of the polyol component, the chain extender component and the crystallization retarding component.

21. A composition according to claim 15, wherein said crystallization retarding component is dipropylene glycol.

22. A composition according to claim 16, wherein said chain extender component is 1,4'-butanediol, ethylene glycol, 1,6-hexanediol, 1,4'-cyclohexanedimethanol, 1,3'-propanediol, and 1,5'-pentanediol, or combinations thereof.

23. A composition according to claim 13, wherein said catalyst is present and comprises stannous octoate, dibutyltin dioctoate, dibutyltin diluarate, bismuth octoate, or a combination thereof.

24. A composition according to claim 13, wherein said composition has been extruded into a membrane, breathable film, sheet, tubing, wire, cable jacketing, shoe sole, hose, or a fiber.

25. A process for preparing a thermoplastic polyurethane having a high crystalline content, comprising the steps of:
extruding in an extruder a thermoplastic polyurethane composition comprising:
a polyol component, wherein said polyol component has a number average molecular weight of about 500 to about 10,000 per polyol;
a polyisocyanate component;
a chain extender component, wherein said chain extender component is an unsubstituted, straight chain diol;

a crystallization retarding component, wherein said crystallization retarding component is a diol which is branched, substituted or contains at least one heteroatom, or a combination thereof, wherein if said diol contains an aromatic group there is no trans— trans-isomers; and optionally, a polyurethane catalyst;

wherein said composition has been extruded, and wherein said composition has a hard segment content of at least 20%.

26. A process according to claim 25 wherein the crystallization retarding component is utilized in an amount so that the hydroxyl group content is from about 1 to about 15 equivalents per 100 equivalents of the total hydroxyl groups of the polyol component, the chain extender component and the crystallization retarding component.

27. A process according to claim 25, wherein said crystallization retarding component is dipropylene glycol, tripropylene glycol, diethylene glycol, triethylene glycol, neopentyl glycol, 1,3-butane diol, 2-methyl-2,4-pentane diol, or a combination thereof.

28. A process according to claim 26, wherein said polyol component comprises hydroxyl terminated polyesters, hydroxyl terminated polyethers, hydroxyl terminated polycarbonates, hydroxyl terminated polycaprolactams, hydroxyl terminated polyolefins, hydroxyl terminated polyacrylates, or a combination thereof, and wherein said polyol component is utilized in an amount so that the hydroxyl group content is generally from about 2 to about 70 equivalents per 100 equivalents of the total hydroxyl groups present in the composition.

29. A process according to claim 26, wherein said polyisocyanate component comprises diphenylmethane-4,4'-diisocyanate.

30. A process according to claim 26, wherein the equivalent weight ratio of polyisocyanate functional groups to total hydroxyl functional groups of the polyol component crystallization retarding component and the chain extender component is from about 0.90 to about 1.10.

31. A process according to claim 25, wherein said composition has a hard segment content of about 30% to about 90%.

32. A process according to claim 26, wherein the crystallization retarding component is utilized in an amount so that the hydroxyl group content is from about 2 to about 12 equivalents per 100 equivalents of the total hydroxyl groups of the polyol component, the chain extender component and the crystallization retarding component.

33. A process according to claim 27, wherein said crystallization retarding component is dipropylene glycol.

34. A process according to claim 28, wherein said chain extender component is 1,4'-butanediol, ethylene glycol, 1,6-hexanediol, 1,4'-cyclohexanedimethanol, 1,3'-propanediol, and 1,5'-pentanediol, or combinations thereof.

35. A process according to claim 25, wherein said catalyst is present and comprises stannous octoate, dibutyltin dioctoate, dibutyltin diluarate, bismuth octoate, or a combination thereof.

36. A process according to claim 25, wherein said composition has been extruded into a membrane, breathable film, sheet, tubing, wire, cable jacketing, shoe sole, hose, or a fiber.

* * * * *

UNITED STATES PATENT AND TRADEMARK OFFICE
CERTIFICATE OF CORRECTION

PATENT NO. : 6,995,231 B2 Page 1 of 1
APPLICATION NO. : 10/036567
DATED : February 7, 2006
INVENTOR(S) : Kemal Onder It is certified that error appears in the above-identified patent and that said Letters Patent is hereby corrected as shown below:

In claim 2, column 17, line 4, please add --15-- before "equivalents per 100 equivalents of the total hydroxyl groups".

Signed and Sealed this

Twentieth Day of March, 2007

JON W. DUDAS
*Director of the United States Patent and Trademark Office*